United States Patent Office 3,302,092
Patented Jan. 31, 1967

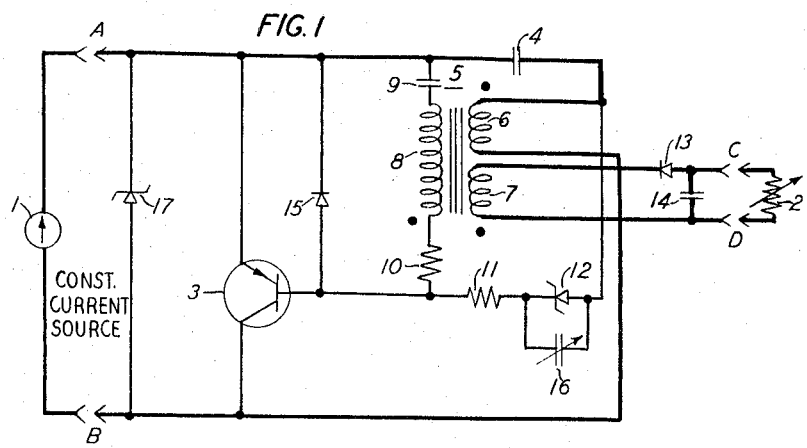
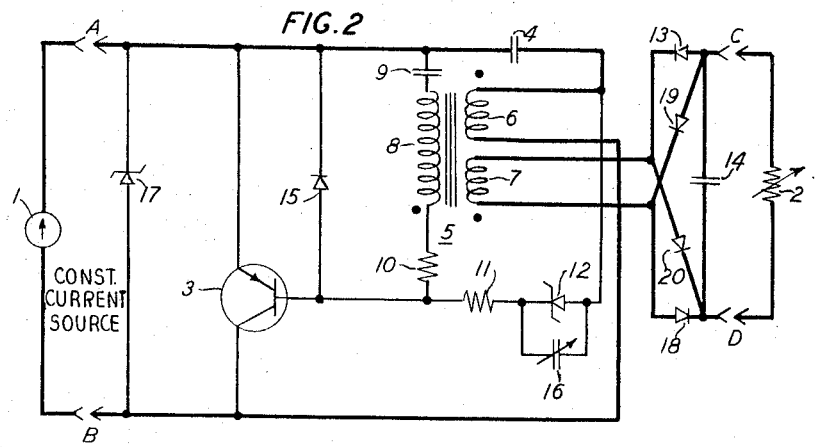
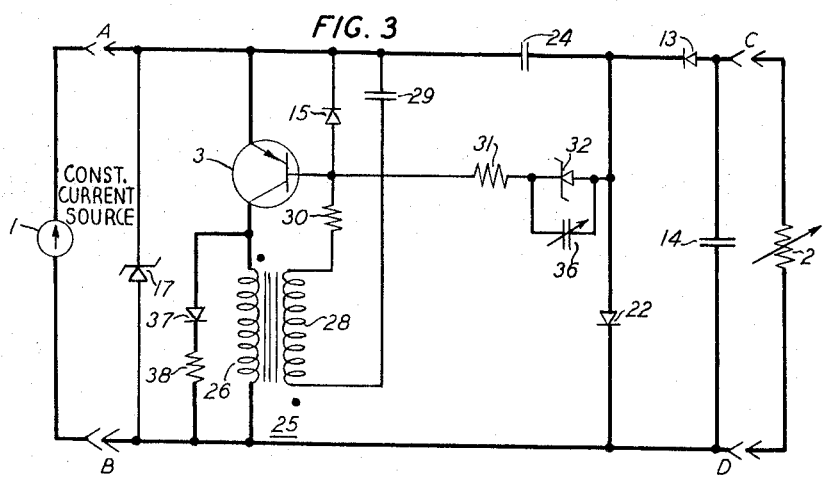
INVENTORS: S. D. BLOOM
R. M. RICKERT
BY Ray M. Porter Jr.
ATTORNEY

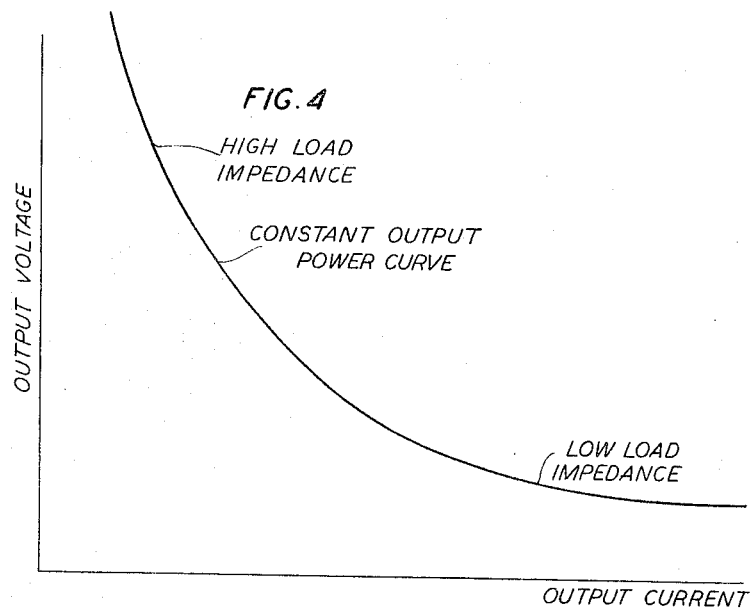
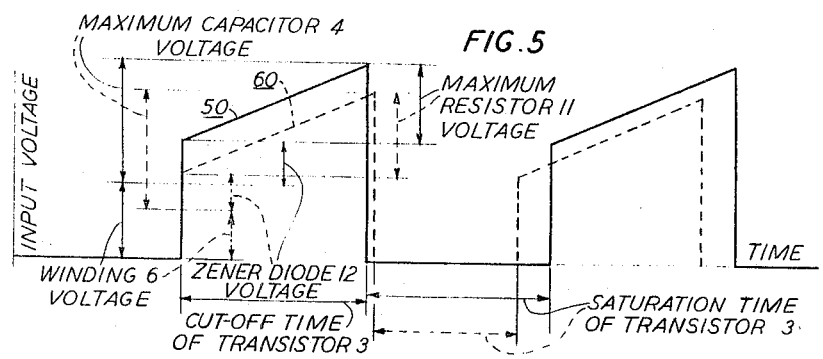
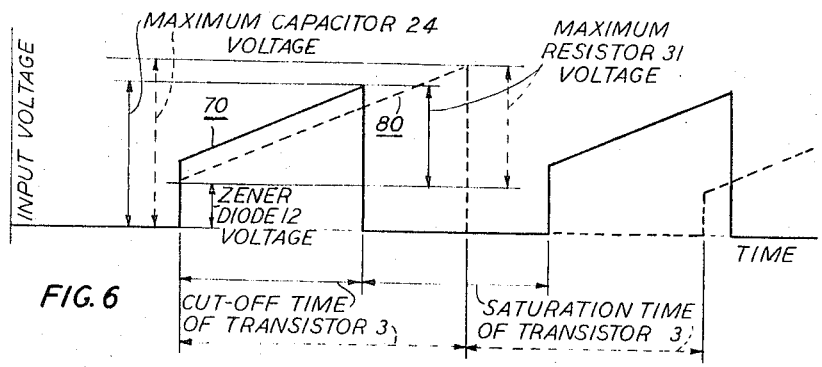

3,302,092
SWITCHING CONVERTER POWER SUPPLY FOR CONSTANT CURRENT INPUTS
Stephen D. Bloom, Forest Hills, N.Y., and Richard M. Rickert, Westfield, N.J., assignors to Bell Telephone Laboratories, Incorporated, New York, N.Y., a corporation of New York
Filed Feb. 25, 1963, Ser. No. 260,662
3 Claims. (Cl. 321—2)

This invention relates to power supplies of the electronic switching converter type and, more particularly, to switching apparatus for supplying power to a load from a source of substantially constant current.

Most electronic switching converter power supplies are adapted to improve the regulation of a source of voltage which is already substantially constant or to step its magnitude up or down.

In the copending application Serial No. 260,916, filed February 25, 1963, now United States Patent 3,249,703, of the applicant Rickert, it is pointed out that substantially constant current is sometimes more naturally available. For instance, in submarine cable systems, experience has shown that the cable gives best performance and longest life when the direct current in the cable is regulated to be constant. Regulators of the type shown in the copending application of B. H. Hamilton, Serial No. 853,559, filed November 17, 1959, now United States Patent 3,135,910, are placed at the land-based terminals of the cable in order to hold the cable direct current constant. In order to amplify the alternating-current information signals which are transmitted over the cable, repeaters are placed at periodic intervals along the cable. Other loads may also be placed along the cable. It is desirable to supply these repeaters and other loads with substantially constant power. Moreover, the regulation performance of the regulators on the shore is improved if the repeater power supplies and any other loads along the cable draw constant average power from the cable. The same requirements apply to long lines other than submarine cables whereon a plurality of spaced repeaters or other loads must be supplied with power.

It is therefore an object of the present invention to supply a substantially constant power to a load of variable impedance from a source of substantially constant current.

According to the invention, apparatus having an input, an output and a switch connected across the input is adapted for supplying substantially constant power to the load connected across the output by electronically varying the closed time and the open time of the switch in response to changes in the load voltage and current so that the average input voltage remains substantially constant. Since the average input power is the product of the average input voltage and the constant input current, the average input power remains substantially constant. Circuit losses in the switching apparatus remain fairly constant. Consequently, the output power remains substantially constant.

In the preferred embodiment of the invention, energy is coupled to the load while the switch is open. A voltage directly related to the voltage across the load is produced while the switch is open and stored until the switch is again closed, and the stored voltage is utilized to keep the switch closed for a time directly related to the voltage across the load. The variation of the closed time compensates for the tendency of the output voltage to be reflected back to the input during the open time of the switch. Appropriate choice of the ratio of certain capacitances keeps the open time of the switch substantially constant. Thus, the average input voltage and power remain substantially constant.

A feature of this embodiment of the invention involves nonlinear variation of the voltage across a Zener diode to modify further the length of time that the switch is kept closed to make the compensation more exact.

An additional feature of this embodiment of the invention is that it may use a transformer for coupling energy to the load while the switch is open. Electrical isolation of the output and voltage step-up or step-down is thereby provided.

In a second embodiment of the invention, energy from the source is stored while the switch is open and then is transferred in part to the output while the switch is closed by a current flowing through the switch into the output. A voltage directly related to the current flowing through the switch into the output is produced and stored for producing a reference voltage while the switch is subsequently open. The switch is closed when the voltage associated with the stored energy rises to a peak voltage which is the sum of a predetermined constant voltage and said reference voltage and is opened when the voltage associated with the stored energy falls to a voltage approaching the output voltage, which is usually between the aforesaid constant voltage and the aforesaid peak voltage. The variation in peak voltage compensates for the variation of closed time of the switch which results from the increase or decrease of time for discharging the stored energy as the output voltage falls or rises, respectively. Thus the input voltage and power remain substantially constant.

An additional feature of the second embodiment of the invention is that the stored energy is transferred to the output without passing through the field of a transformer. Absence of a power transformer gives the second embodiment of the invention compactness and light weight.

Other features and objects of the invention will become apparent from the following detailed description and the drawing in which:

FIG. 1 is a schematic diagram of a first preferred embodiment of the invention;

FIG. 2 is a modification of the embodiment of FIG. 1 for improving efficiency;

FIG. 3 is a schematic diagram of a second embodiment of the invention; and

FIG. 4, FIG. 5 and FIG. 6 show curves which are useful in explaining the theory and operation of the invention.

In the preferred embodiment of the invention illustrated in FIG. 1, current source 1 produces a substantially constant current from which power is to be obtained for load 2. The interposed circuit between terminals A–B and C–D is provided to draw a constant power from source 1 and to deliver a constant power to load 2, even though the impedance of load 2 may vary.

As the load impedance rises or falls, the output voltage will rise or fall, respectively. But if the output current falls or rises, respectively, by a sufficient amount, as illustrated in FIG. 4, the output power will remain constant; and the object of the invention will be achieved. The easiest way to understood how the output characteristic of FIG. 4 is achieved is to consider the input voltage. Since the input current stays constant, constant average input voltage would give constant average input power. Changes in losses in the switching circuitry are sufficiently small that it may be said that the output power remains substantially constant when the input voltage remains substantially constant. The remarks hereinafter will be directed primarily toward average input voltage.

A transistor switching converter which provides compensation according to the invention is connected as follows, as shown in FIG. 1. The emitter-collector current path of PNP transistor 3 is connected across input terminals A and B as a shunt switch. The emitter of transistor 3 is connected to terminal A and the collector of transistor 3 is connected to terminal B. The positive terminal of source 1 is connected to terminal A, and the negative terminal of source 1 is connected to terminal B. The anode of Zener diode 17 is connected to the collector of transistor 3, and its cathode is connected to the emitter of transistor 3 in order to protect transistor 3 from excessive input voltages in the event of circuit failure. Capacitor 4 and primary winding 6 of transformer 5 are connected in series across terminals A and B with capacitor 4 connected to terminal A. Rectifying diode 13 and filter capacitor 14 are connected in series across output winding 7 of transformer 5. Winding 6, winding 7 and diode 13 are oriented with respect to each other so that diode 13 conducts when the induced voltage of winding 6 tends to oppose current flowing from source 1. Capacitor 14 is connected across output terminals C and D, and load 2 is connected across terminals C and D. The portion of the circuit which couples power from source 1 to load 2 is shown with heavy black lines.

A trigger circuit according to the invention comprises a loop including capacitor 4, the base-emitter junction of transistor 3, resistor 11, and a Zener diode 12 having its anode connected to the junction between capacitor 4 and winding 6. It may be seen that Zener diode 12 is oriented so that the base-emitter junction of transistor 3 will not conduct until capacitor 4 has charged to a voltage in excess of the breakdown voltage of Zener diode 12 plus the voltage across resistor 11. Capacitor 16 is connected across Zener diode 12 as an auxiliary component of the trigger circuit.

A feedback circuit connected to cooperate with the trigger circuit, according to the invention, comprises winding 8 of transformer 5, capacitor 9 and resistor 10 connected in series between the base and emitter electrodes of transistor 3. Winding 8 is oriented with respect to winding 6 and the base-emitter junction of transistor 3 so that the induced voltage of winding 8 opposes the flow of base-emitter current in transistor 3 when the induced voltage of winding 6 tends to oppose current flowing from source 1. Capacitor 9 is of the order of a thousand times smaller than capacitor 4 in order to have negligible shunting effect on capacitor 4. Capacitor 16 has a value in the same order of magnitude as capacitor 9 and is adjusted as described hereinafter. Resistor 10 is chosen to limit the maximum base current of transistor 3 during saturation conduction of transistor 3. To facilitate operation of the circuit in several respects, diode 15 is connected across the base-emitter junction of transistor 3 with a conduction polarity opposite to that of the base-emitter junction. The anode of diode 15 is connected to the base of PNP transistor 3, and the cathode of diode 15 is connected to the emitter of transistor 3.

In operation, transistor 3 will block and thus be an open switch across input terminals A and B whenever it lacks a base current. In that case, the substantially constant current from source 1 may flow through either of two paths. First and principally, it will flow through capacitor 4 and primary winding 6 of transformer 5 back to source 1. Second, a part of it will flow through capacitor 9, feedback winding 8 of transformer 5, resistors 10 and 11, capacitor 16 and Zener diode 12 in parallel, and through winding 6 back to source 1. It may be seen that both components of the input current flow through winding 6. The input current may be established substantially instantaneously in winding 6 because diodes 15 and 13 permit current flows in response to the induced voltages in windings 8 and 7, respectively, which facilitate the change of current in winding 6. The interconnection of capacitor 9 with winding 8 also facilitates the change in current, by discharging previously stored energy to aid winding 8 in producing a current which minimizes leakage inductance effects of transformer 5. In general, during the period switch 3 is nonconducting, the induced voltages in all three windings are clamped at or near values which are the product of the output voltage across capacitor 14 and the respective turns ratios of each winding with respect to winding 7. The current flow through rectifier diode 13 delivers power to filter-capacitor 14 and load 2.

As the voltage on capacitor 4 increases, less of the current from winding 8 flows through diode 15; and more of that current flows through resistor 11. Finally, when all of the current from winding 8 flows through resistor 11, the voltage on capacitor 4 just equals the breakdown voltage of Zener diode 12 plus the voltage across resistor 11. This condition is represented by the peaks of the input voltage wave forms 50 and 60 shown in FIG. 5.

A further increase in the voltage across capacitor 4 forward biases the base-emitter junction of transistor 3, and a part of the current from source 1 is shunted around capacitor 4 through the base-emitter junction, resistor 11, Zener diode 12 and winding 6.

A strongly regenerative sequence of events follows. The base current of transistor 3 permits current from source 1 to flow from emitter to collector of transistor 3, thereby bypassing winding 6. This decrease of current in winding 6 reverses the induced voltage in all three windings of transformer 5. The induced voltage of winding 8 now promotes base current of transistor 3. The voltage on capactior 9 also now promotes the base current of transistor 3. Transistor 3 saturates, and the constant current of source 1 flows directly from source 1 through the emitter-collector path of transistor 3 back to source 1. During this portion of the operation, the input voltage is substantially zero, as indicated by the portion of the curve of FIG. 5 marked "Saturation time of transistor 3." It may be noted that no power is drawn from source 1 during this period of time.

Capacitor 4 now discharges until transistor 3 switches off. Switch-off, or cut-off, of transistor 3, that is, opening of the switch, occurs when the base current is no longer sufficient to allow passage of a collector current at least as large as the current of source 1. At this time, the voltage of capacitor 4 has decreased almost to the voltage across Zener diode 12, and the voltage drop across resistor 11 is negligible. It will be explained hereinafter that the voltage across Zener diode 12 is not necessarily that value commonly called the "breakdown voltage." Some of the current of source 1 then flows through winding 6 either by way of capacitor 4 or by way of capacitor 9, winding 8, resistors 10 and 11 and Zener diode 12. The induced voltage of winding 8 produced by the increasing current in winding 6 produces a regenerative effect which completely shuts off transistor 3 by reverse-biasing its base-emitter junction. Capacitor 4 commences recharging toward its peak voltage, as described hereinbefore.

It may be noted that a resistor 11 of appreciable magnitude in relation to the impedance of Zener diode 12 helps to stabilize the circuit and to limit the operating frequency. If resistor 11 is too small, the permissible voltage change on capacitor 4 is so small as to be dependent on the dynamic qualities of Zener diode 12. The voltage on capacitor 4 may hover so near the Zener diode breakdown voltage that the circuit operating frequency becomes excessive; or transistor 3 may bias itself permanently at some class A (unsaturated) operating point.

Having followed the circuit of FIG. 1 through a complete cycle of operation, we may examine more closely the effect of a change in the load voltage upon the input voltage. From FIG. 1, it may be seen that the input voltage, during the time transistor 3 is cut off or not conducting, equals the sum of the voltage across winding 6 and the voltage across capacitor 4. While transistor 3 is conducting, the input voltage is negligible. These facts are illustrated by curves 50 and 60 of FIG. 5.

The average input voltage, which is held substantially constant by the invention, is directly related to wave form height, including "winding 6 voltage," and is inversely related to cycle length, including "saturation time of transistor 3." These facts may be readily seen by comparing curve 50, which has the larger output and winding 6 voltages, with curve 60, which has the smaller output and winding 6 voltages. It will be recalled from the foregoing discussion that the voltage across winding 6 during the cut-off time of transistor 3 is equal to the output voltage times the turns ratio of winding 6 to winding 7. Thus, the wave form height in FIG. 5 rises as the output voltage rises, and falls as the output voltage falls.

According to the invention, as embodied in FIG. 1, the trigger circuit and feedback circuit cooperate to stretch out the cycle length as the output voltage increases and to reduce cycle length as the output voltage decreases. The cycle length is varied primarily by varying the saturation time of transistor 3, as may be seen by comparing curves 50 and 60 of FIG. 5. It will be recalled that the voltage across winding 8 during the cut-off time of transistor 3 is equal to the output voltage times the turns ratio of winding 8 to winding 7. By the time that current has ceased to flow through diode 15, most of the winding 8 voltage is stored in the opposite polarity on capacitor 9. After transistor 3 is forward biased and the winding voltages regeneratively reverse, as described hereinbefore, capacitor 9 and winding 8 both promote base current in transistor 3. The discharge of capacitor 4 through the base-emitter junction occurs more slowly than usual when the voltage across the base-emitter junction is increased by an increased voltage stored on capacitor 9 by winding 8 in response to an increased output voltage. Thus, the saturation time is lengthened, tending to compensate the average input voltage for the increased voltage across winding 6.

Capacitor 4 discharges more rapidly than usual when the voltage across the base-emitter junction is decreased by a decreased voltage stored on capacitor 9 by winding 8 in response to a decreased output voltage. Thus, the saturation time is shortened, tending to compensate the average input voltage for the decreased voltage across winding 6. This is the case illustrated by dotted curve 60 of FIG. 5, assuming that solid curve 50 represents the usual condition.

Certain other features of the circuit play an important role in assuring that the compensation is adequate.

First, according to one feature of the invention, capacitor 16 is adjusted to a sufficiently small value such that its voltage falls appreciably during each saturation time of transistor 3. Of course, the voltage on capacitor 16 falls more during a long saturation period than during a short one; and Zener diode 12 slips over the knee of its Zener characteristic by a greater or lesser amount near the end of the saturation period. The lower the voltage across Zener diode 12, the longer the time that capacitor 4 can discharge, and the higher the voltage across Zener diode 12, the shorter the time that capacitor 4 can discharge.

This nonlinear effect accentuates the variation of the saturation period of transistor 3 already produced by capacitor 9 in response to output voltage changes, as described above. Furthermore, the smaller capacitor 16 is, the greater will be the increase in the length of the saturation period for a given increase in output voltage; and the greater will be the decrease in the length of the saturation period for a given decrease in output voltage. Without any capacitor 16, the circuit is actually overcompensated with respect to input voltage because the input voltage will rise as the output voltage falls and vice versa. For any given combination of other circuit parameters with the approximate relationships described hereinbefore, there exist values of capacitance 9 and capacitance 16 which will hold the input voltage, and therefore the input power, substantially constant as the output voltage varies.

Second, the maximum voltages on resistor 11 and capacitor 4 are prevented from following the output voltage, and thus impairing the compensation described above, by means of the very small ratio of capacitor 9 to capacitor 4. In essence, the voltage on capacitor 9 responds rapidly enough to the voltage on winding 8 that an increased feedback voltage across winding 8 does not substantially increase the portion of the input current which is shunted around capacitor 4 through capacitor 9. Conversely, a decreased feedback voltage across winding 8 does not substantially decrease the portion of the input current which is shunted around capacitor 4 through capacitor 9. It is this shunted portion of the input current which flows through resistor 11, and thus determines the maximum voltage on capacitor 4. Since its value at the moment at which closing or saturation of transistor switch 33 occurs does not vary substantially with output voltage, neither does the portion of the curve of FIG. 5 which is marked "maximum capacitor 4 voltage." In fact, except for the operation of Zener diode 12 on the knee of its characteristic, the cut-off time of transistor 3 remains substantially constant as the output voltage varies.

Thus, the operation of the embodiment of FIG. 1 may be summarized in the statement that variations in saturation time compensate the average input voltage for variations in winding 6 voltage, as reflected from the output.

The circuit of FIG. 2 differs from the circuit of FIG. 1 in that a diode bridge rectifier is used to couple to the output part of the energy that would ordinarily be dissipated internally in the circuit during the saturation of transistor 3.

Specifically, the terminal of winding 7 and the terminal of capacitor 14 which were connected together in FIG. 1 are disconnected. The anode of diode 18 is connected to that terminal of winding 7, and the cathode of diode 18 is connected to that terminal of capacitor 14. The anodes of diodes 19 and 20 are connected to the anode and the cathode of diode 13, respectively; and the cathodes of diodes 19 and 20 are connected to the anode and the cathode of diode 18, respectively. The operation of the circuit, as described above, is substantially unaffected, except for some increase in efficiency since a portion of the stored energy of transformer 5 is coupled to the output during the saturation of transistor 3.

FIG. 3 illustrates a second embodiment of the invention which also operates from a constant current source and exhibits many of the same characteristics as the preferred embodiment of the invention, as illustrated in FIGS. 1 and 2.

The positive terminal of source 1 is connected to input terminal A, and the negative terminal of source 1 is connected to input terminal B. The shunt switch connected across input terminals A and B now comprises the emitter-collector current path of PNP transistor 3 in series with the parallel combination of primary winding 26 of transformer 25 and a bypass path including diode 37 and resistor 38 connected in series. That is, the emitter of transistor 3 is connected to terminal A, and the collector of transistor 3 is connected to one terminal of primary winding 26. The other terminal of winding 26 is connected to terminal B. The anode of diode 37 is connected to the collector of transistor 3. The cathode of diode 37 is connected to one terminal of resistor 38. The other terminal of resistor 38 is connected to terminal B. The anode of protective Zener diode 17 is connected to terminal B, and its cathode is connected to terminal A.

Capacitor 24 and diode 22 are connected in series across input terminals A and B with the cathode of diode 22 connected to terminal B. Rectifying diode 13 and filter capacitor 14 are connected in series across diode 22, with the cathode of diode 13 connected to the anode of diode 22. The terminals of capacitor 14 are connected across output terminals C and D, and load 2 is connected across output terminals C and D. The portions of the circuit of FIG. 3 which couple power from source 1 to load 2 are drawn with heavy black lines.

A trigger circuit according to the invention comprises the series loop including capacitor 24, the base-emitter junction of transistor 3, resistor 31, and Zener diode 32. One terminal of resistor 31 is connected to the base electrode of transistor 3, and the other terminal of resistor 31 is connected to the cathode of Zener diode 32. The anode of Zener diode 32 is connected to the anode of diode 22. Capacitor 36 is connected across Zener diode 32 as an auxiliary component of the trigger circuit. Capacitor 36 is large enough to hold the voltage across Zener diode 32 substantially constant.

A feedback circuit which cooperates with the trigger circuit according to the invention comprises secondary winding 28 of transformer 25, capacitor 29 and resistor 30 connected in series between the base and emitter electrodes of transistor 3. Winding 28 is oriented with respect to winding 26 and the base-emitter junction of transistor 3 so that its induced voltage promotes the flow of base-emitter current in transistor 3 when the induced voltage of winding 26 tends to oppose current flowing from source 1. Capacitors 24 and 29 are of approximately the same order of magnitude in order that a fairly large component of the input current may flow through resistor 31. In other words, capacitor 29 will have substantial shunting effect upon capacitor 24; whereas in the circuit of FIG. 1 capacitor 9 has negligible effect upon capacitor 4. As in FIG. 1, the anode of diode 15 is connected to the base of transistor 3 and its cathode is connected to the emitter of transistor 3.

In the operation of the embodiment of FIG. 3, transistor 3 will block whenever it lacks a base current. In that case, the substantially constant current from source 1 flows in part through capacitor 24 and diode 22 and in part through capacitor 29, winding 28, resistors 30 and 31, Zener diode 32 and diode 22 back to source 1. Energy is stored on capacitor 24 for subsequent delivery to the output.

The voltage on capacitor 24 will rise until it equals the sum of the voltages across Zener diode 32 and resistor 31. Concurrently with the charging of capacitor 24, a current through resistor 31 and Zener diode 32 is promoted by winding 28 and capacitor 29 as they discharge energy stored during the previous saturation period of transistor 3. As the voltage on capacitor 24 rises above the sum of the voltages on resistor 31 and Zener diode 32, transistor 3 is forward biased and conducts a current through its emitter-base junction which is shunted around capacitor 24 through resistor 31. As current from source 1 starts to flow through the base-emitter junction of transistor 3, part of the current from source 1 is also allowed to flow from emitter to collector of transistor 3. This current will split between the branch including diode 37 and resistor 38 and the branch including winding 26. Increasing current flow in winding 26 induces a voltage in winding 28 which promotes base current flow in transistor 3. Increased base current allows an increased portion of the current of source 1 to flow through the collector of transistor 3, thereby increasing the current in winding 26. A rapidly regenerative action takes place until transistor 3 saturates and all the current from source 1 is flowing through the collector of transistor 3. Capacitor 29 first discharges its voltage which is aiding the induced voltage of winding 28, and then charges with a voltage which opposes the induced voltage of winding 28. In addition, capacitor 24 will discharge both through the base and through the collector of transistor 3, so long as its voltage exceeds the voltages on capacitors 36 and 14, respectively.

Saturation of transistor 3 will be maintained until the current in winding 26 starts to decrease because of the decreasing voltage difference between capacitors 24 and 14. In normal steady state operation of the circuit, the voltage on capacitor 14 usually exceeds the voltage of Zener diode 32 and is less than the maximum voltage on capacitor 24. Since capacitor 24 cannot discharge below the voltage on capacitor 14, the knee of the leading edge of the input voltage wave form in FIG. 6, which is also the capacitor 24 voltage at the time transistor 3 is cut off, exceeds the voltage of Zener diode 32.

The induced voltage of winding 28 resulting from the current decrease in winding 26 as the voltage on capacitor 24 approaches the voltage on capacitor 14 causes the base current of transistor 3 to fall below the value needed to sustain the then-existing collector current. The collector current must decrease still further, and the resulting decrease in current through primary winding 26 induces a voltage in winding 28 which opposes and further decreases the base current of transistor 3. This regenerative action quickly turns transistor 3 off.

Having followed the circuit of FIG. 3 through a complete cycle of operation, we may examine more closely the effect of a change in load voltage upon the input voltage.

In FIG. 6, dotted curve 80 represents the input voltage when the output voltage has fallen in comparison to the output voltage for input voltage curve 70.

It will be noted that capacitor 24 takes longer to discharge when the output voltage falls and less time to discharge as the output voltage rises, and the saturation time of transistor 3 will vary correspondingly. Moreover, the knee of the curve of FIG. 6 will be nearer or farther from, respectively, the "Zener diode 12 voltage." The variation of saturation time and the moving of the knee of the curve of FIG. 6 are unwanted reflected effects of the output voltage.

At the moment that transistor 3 turns off, the energy stored in the field of transformer 25 and on capacitor 29 will be inversely related to the output voltage just before transistor 3 started to turn off because a decrease in output voltage will tend to increase the current through winding 26 and an increase in output voltage will tend to decrease the current through winding 26. The energy stored in the field of transformer 25 and on capacitor 29 during the saturation period are both directly related to the current through winding 26 during the saturation period. As indicated above, winding 28 and capacitor 29 discharge this stored energy after transistor 3 becomes nonconducting in part through diode 15 and in part through resistor 31, Zener diode 32 and capacitor 24. Therefore, as the average output voltage falls, the maximum voltage across resistor 31 increases and the maximum voltage to which capacitor 24 charges also increases, as illustrated by dotted curve 80 of FIG. 6.

It will be recalled that the unwanted reflected effects of the output voltage were the variation of the saturation time of transistor 3 in inverse relation with the output voltage and the variation of the knee of the input voltage curve directly with output voltage. Thus, a decrease in output voltage increases the saturation time and tends to decrease the average input voltage. However, as the output voltage falls, the charging of capacitor 24 to a higher maximum voltage tends to raise the average input voltage and tends to compensate for the lengthening of saturation time caused by the fall of the output voltage, as shown by curve 80 in comparison with curve 70 of FIG. 6. Reversed compensating effects occur when the output voltage rises. That is, the saturation time shortens, and capacitor 24 charges to a lower maximum voltage.

The output-voltage-dependent voltage across resistor 31 may be considered a first reference voltage. The constant voltage across Zener diode 32 is then a second reference voltage. Together, they determine the maximum voltage on capacitor 24 in such a way as to compensate the average input voltage for the unwanted reflected effect of the output voltage upon the saturation time.

The circuit of FIG. 3 is particularly distinguished by lightweight, compactness and simplicity. Lightweight results particularly from the fact that the output power is not transferred through the field of transformer 25, so that a relatively small ferromagnetic core is feasible. In fact, applicants call this circuit a "transformerless" converter.

It will be noted that both the embodiment of FIG. 1 and the embodiment of FIG. 3 deliver a substantially constant power to a variable impedance load from a source of substantially constant current. The trigger circuits and feedback circuits of the two embodiments are structurally similar except for relative sizes of capacitors. The differing capacitor sizes are adaptations to the differing modes of delivering energy to load 2, as described hereinbefore.

The means for coupling power to the load are similar in that, in FIGS. 1, 2 and 3, the input of a coupling circuit is connected in series with a capacitor across the input of the entire apparatus. Thus, in FIGS. 1 and 2, winding 6 is connected in series with capacitor 4 across the input terminals A and B; and in FIG. 3, rectifying diode 13 and capacitor 14 are connected in series with capacitor 24 across input terminals A and B when diode 22 is blocking. Winding 6 is the coupling circuit input in FIGS. 1 and 2, while diode 13 and capacitor 14 comprise the coupling circuit input in FIG. 3. In both cases, capacitor 14 is the output of the coupling circuit and of the entire apparatus.

In all cases it is understood that the above-described arrangements are merely illustrative of a small number of the many possible applications of the principles of the invention. Numerous and varied other arrangements in accordance with these principles may readily be devised by those skilled in the art without departing from the spirit and scope of the invention.

What is claimed is:

1. Apparatus for supplying substantially constant power to a variable impedance load from a source of substantially constant current, comprising a pair of input terminals and a pair of output terminals, a transistor having emitter and collector electrodes connected between said pair of input terminals and having a base electrode, a filter capacitor connected between said pair of output electrodes, a transformer having a primary winding connected between said pair of input terminals in shunting relationship with respect to said emitter and collector electrodes and an output winding connected between said pair of output terminals in shunting relationship with respect to said filter capacitor, said transformer having a feedback winding connected between said base and emitter electrodes in polarity to provide regenerative operation of said transistor, a rectifier connected serially with said output winding between said output terminals, a second capacitor connected serially with said primary winding between said input terminals, a voltage-dropping circuit connected serially with said second capacitor between said base and emitter electrodes in shunting relationship with respect to said feedback winding, and a third capacitor connected serially with said feedback winding between said base and emitter electrodes, said third capacitor having a capacitance sufficiently smaller than the capacitance of said second capacitor to have negligible shunting effect upon said second capacitor.

2. Apparatus according to claim 1 in which the voltage dropping circuit comprises a Zener diode connected in breakdown polarity serially with said second capacitor between said base and emitter electrodes and a fourth capacitor shunting said Zener diode and having a value that provides a variation in the voltage across said Zener diode from its breakdown value to a value appreciably lower than said breakdown value during each period of conduction of said transistor.

3. Apparatus according to claim 1 including a diode connected between the base and emitter electrodes of the transistor in shunting relationship with respect to the feedback winding and the third capacitor and in a polarity to conduct when the transistor is nonconductive.

References Cited by the Examiner
UNITED STATES PATENTS

| | | | |
|---|---|---|---|
| 2,791,739 | 5/1957 | Light | 321—2 |
| 2,917,700 | 12/1959 | Chase | 323—22 |
| 2,998,577 | 8/1961 | Sherin | 321—2 X |
| 3,088,067 | 4/1963 | Sender | 323—22 |
| 3,174,096 | 3/1965 | Lichowsky | 323—22 |
| 3,204,174 | 8/1965 | Clerc | 323—22 |
| 3,214,673 | 10/1965 | Cock | 323—22 X |

JOHN F. COUCH, *Primary Examiner.*

W. E. RAY, *Assistant Examiner.*